US012809154B2

(12) United States Patent
Türschmann et al.

(10) Patent No.: US 12,809,154 B2
(45) Date of Patent: Nov. 24, 2026

(54) OPTICAL MODULE

(71) Applicant: BRUKER OPTICS GMBH & CO. KG, Ettlingen (DE)

(72) Inventors: Pierre Türschmann, Erlangen (DE); Daniel Böning, Erlangen (DE); Rinat Tyumenev, Erlangen (DE)

(73) Assignee: BRUKER OPTICS GMBH & CO. KG, Ettlingen (DE)

( * ) Notice: Subject to any disclaimer, the term of this patent is extended or adjusted under 35 U.S.C. 154(b) by 151 days.

(21) Appl. No.: 18/716,034

(22) PCT Filed: Aug. 16, 2022

(86) PCT No.: PCT/EP2022/072869
§ 371 (c)(1),
(2) Date: Jun. 3, 2024

(87) PCT Pub. No.: WO2023/099048
PCT Pub. Date: Jun. 8, 2023

(65) Prior Publication Data

US 2025/0020901 A1 Jan. 16, 2025

(30) Foreign Application Priority Data

Dec. 3, 2021 (DE) ..................... 10 2021 131 952.8

(51) Int. Cl.
*G02B 21/16* (2006.01)
*G01N 21/64* (2006.01)
(Continued)

(52) U.S. Cl.
CPC ......... *G02B 21/16* (2013.01); *G01N 21/6458* (2013.01); *G02B 21/06* (2013.01);
(Continued)

(58) Field of Classification Search
CPC ...... G02B 21/16; G02B 21/06; G02B 21/361; G02B 21/367; G01N 21/6458
See application file for complete search history.

(56) References Cited

U.S. PATENT DOCUMENTS

2016/0363728 A1 12/2016 Wang et al.

FOREIGN PATENT DOCUMENTS

DE 102010029612 A1 12/2011
EP 2425286 B1 6/2020
(Continued)

OTHER PUBLICATIONS

Grandin, H. et al., "Waveguide excitation fluorescence microscopy: A new tool for sending and imaging the biointerface," Biosensors & Bioelectronics, vol. 21, No. 8, Feb. 15, 2006, Available Online at Aug. 30, 2005, 7 pages.
(Continued)

*Primary Examiner* — James A Dudek
(74) *Attorney, Agent, or Firm* — McCoy Russell LLP

(57) ABSTRACT

The present invention relates to a module for optically exciting a sample volume by means of an optical chip, comprising a control unit, a holding device for an optical chip, at least one coupling unit for guiding light into the optical chip, a positioning unit designed to position the coupling unit or at least parts thereof relative to the optical chip, and at least one detection unit for capturing light from at least one thin-film waveguide of the optical chip, a signal concerning the light captured by the detection unit, in particular concerning the intensity of said light, being transmitted to the control unit, which is designed to control the at least one light source and/or the positioning unit on the basis of the signal.

15 Claims, 7 Drawing Sheets

(51) Int. Cl.
*G02B 21/06* (2006.01)
*G02B 21/36* (2006.01)

(52) U.S. Cl.
CPC ......... *G02B 21/361* (2013.01); *G02B 21/367* (2013.01); *G01N 21/648* (2013.01)

(56) References Cited

FOREIGN PATENT DOCUMENTS

| | | | | | |
|---|---|---|---|---|---|
| GB | 2549298 | A | | 10/2017 | |
| WO | WO-2011151307 | A2 | * | 12/2011 | ............... G02B 6/34 |

OTHER PUBLICATIONS

ISA European Patent Office, International Search Report Issued in Application No. PCT/EP2022/072869, Nov. 10, 2022, WIPO, 5 pages.

* cited by examiner

OPTICAL MODULE

CROSS REFERENCE TO RELATED APPLICATIONS

The present application is a U.S. National Phase of International Application No. PCT/EP2022/072869 entitled "OPTICAL MODULE," and filed on Aug. 16, 2022. International Application No. PCT/EP2022/072869 claims priority to German Patent Application No. 10 2021 131 952.8 filed on Dec. 3, 2021. The entire contents of each of the above-listed applications are hereby incorporated by reference for all purposes.

TECHNICAL FIELD

The present invention relates to a module for optically exciting a sample volume by means of an optical chip, which is preferably used in the field of total internal reflection fluorescence microscopy.

BACKGROUND AND SUMMARY

Total internal reflection fluorescence (TIRF) is a microscopy technique widely used in biology or biophysics to observe near-surface dynamics. These can be, for example, bioparticles such as proteins that are located on a cell membrane at a small distance from the microscope substrate. These dynamics are often detected indirectly via fluorescent dyes attached to the particle under investigation. In addition, scattered light-based approaches are also possible. In both approaches, the optical excitation takes place via an evanescent field that is generated on the sample side of the microscope substrate. One characteristic of the evanescent field is that only the area close to the surface (<200 nm) is illuminated, whereas the rest of the sample is not exposed to light and therefore cannot generate a background signal.

Conventionally, the evanescent field is generated by a totally reflected light beam at the glass-substrate-sample interface. In classical objective-based TIRF, the light beam must be focused off the optical axis in the rear aperture of the microscope objective and then leaves the objective at an angle. If the beam angle is large enough for total internal reflection at the substrate-sample interface, an evanescent wave is generated.

Current microscopes that enable TIRF measurements use a laser beam that is focused from the optical axis to the rear aperture of the objective lens so that the beam can be totally reflected at the coverslip-sample interface. This method requires extremely precise placement of the beam. Slight variations in objective lens position and beam placement have a significant impact on the evanescent field penetration depth and lateral illumination profile. These variations can be caused, for example, by mechanical shifts due to temperature changes or by vibrations generated by AC cooling or human presence next to the microscope. TIRF measurements, which require absolute precision of the illumination intensity in the sample volume, become very difficult. Furthermore, since the maximum angle a beam can leave the objective is given by the numerical aperture (NA), objectives with high NA are required to allow total internal reflection at the substrate-sample interface. Lenses with high NA are the most expensive lenses on the market. However, these objectives also limit the observable field of view (FOV) to a few hundred micrometers. Large scale imaging, e.g. of several tens of cells, is not possible with high NA objectives.

Conventional approaches thus require a very precise adjustment of the beam position in the rear aperture of the microscope objective to generate the evanescent field, since the penetration depth of the evanescent field depends on the angle at which the light beam strikes the substrate-sample interface.

In addition, the lateral extent of the evanescent field is limited to typically 100×100 $\mu m^2$ in such approaches. Due to the scattering of the light beam, inhomogeneities occur in the sample illumination with regard to intensity distribution and penetration depth into the field of view. In addition, conventional approaches require a bulky microscope device without the ability to dynamically control the intensity of the light delivered to the sample via the evanescent field.

The present invention is based on the object of mitigating or even completely eliminating the problems of the prior art. In particular, the present invention is based on the object of providing a simplified option for TIR microscopy with an enlarged observation area.

This object is achieved by means of the subject matter of the independent claims. Advantageous further embodiments are specified in the dependent claims.

In contrast to conventional methods, the evanescent field can also be generated via a light mode propagating in a thin layer of dielectric material. If this dielectric, mode-containing layer is the sample holder, the guided mode can interact with the sample and thereby generate an evanescent field in the sample volume.

A monolithic, waveguide-based approach can avoid the disadvantages of conventional solutions. The penetration depth is preferably adjusted via the waveguide geometry, the illuminated area is only limited by the waveguide dimensions and is homogeneous in every respect, a module according to the invention fits on a conventional microscope stage and the evanescent field strength can preferably be actively adjusted via a feedback signal by means of sensors, for example photodiodes, which measure the intensity of the light propagating in waveguide mode.

In other words, the present disclosure describes a compact excitation system or module which enables evanescent excitation of the sample volume via an optical chip, preferably without the use of a microscope objective.

A module according to the invention for optically exciting a sample volume by means of an optical chip, comprises a control unit, a holding device for an optical chip, at least one coupling unit into which light from the at least one light source is coupled, a positioning unit which is configured to position the optical chip relative to the first coupling unit and/or an imaging optical system, and at least one detection unit for detecting light from at least one thin-film waveguide of the optical chip, wherein a signal relating to the light detected by the detection unit, in particular relating to its intensity, is transmitted to the control unit, which is configured to control the at least one light source and/or the positioning unit on the basis of the signal.

A module according to the invention thus makes it possible to excite a sample volume via an evanescent field. The evanescent field is generated on an optical chip with one or more waveguides, in particular thin-film waveguides. For this purpose, the optical chip is inserted into a holding device or a chip carrier.

A module according to the invention can be equipped with at least one light source for introducing light into the optical chip and/or have a holder for an external light source, which is preferably inserted into the holder during operation of the module.

Via the at least one coupling unit, light is selectively directed from the at least one light source onto the optical chip and coupled via a coupling structure, such as a diffractive element, into a waveguide of the chip there. The system can be equipped with several light sources, in particular up to nine light sources, whose light is transmitted to the optical chip via a common optical fiber and via a common optical system, for example.

In other words, the coupling unit preferably comprises an optical system which makes it possible to send a light beam onto the coupling elements of the chip, in particular at least one coupling element, e.g. a diffractive element. The detection unit preferably intercepts the light from a further coupling element of the chip, in particular from at least one outcoupling element, e.g. a diffractive element, and preferably detects its intensity by means of a sensor, such as a photodiode.

In other words, a module according to the invention preferably comprises a coupling unit and a detection unit, which are configured, for example, to respectively introduce light from the light sources into the chip and to collect light from the chip. The coupling unit and the detection unit may be integrated or accommodated in a common unit of the module, for example a coupling system or coupling module.

The chip preferably comprises corresponding coupling elements, for example in the form of diffractive elements, into which the light from the coupling unit of the module can be coupled and/or which decouple light from the chip for onward transmission to the detection unit of the module. The design of the coupling elements of the chip can be freely selected according to the requirements of a specific application.

The coupling unit, as well as the light source(s) and/or the positioning unit, which can preferably move the holding device for the chip, are electronically controlled via a control unit. Preferably, the control unit performs automatic control in such a way that the light intensities present in the waveguide(s) correspond to a desired value. The optical chip is preferably an exchangeable element (disposable) on which the sample is in direct contact with the thin-film waveguides located on the chip.

A module according to the invention is intended, for example, for use with an optical imaging system that enables the sample volume to be detected with spatial resolution. This can, for example, be an inverted or an upright microscope.

The invention enables the defined excitation of a specific part of the sample volume via different waveguides, with different excitation wavelengths and with different penetration depths. The module is also able to monitor the intensity of the mode guided in the waveguide and to automatically optimize the coupling of the light into the waveguide.

With a module according to the invention, the beam path between spatially resolved detection of the sample volume and the optical excitation is also completely decoupled from each other. At the same time, the module ensures a well-defined excitation of the sample volume close to the optical chip (a few 100 nm) over a very large lateral range of up to a few $mm^2$.

According to one embodiment of the invention, the control unit is further configured to control, on the basis of the signal relating to the light detected by the detection unit, in particular relating to its intensity, a focusing optical system and/or a deflection optical system, preferably in such a way that the coupling of light into the at least one thin-film waveguide of the optical chip is optimized. For example, the focusing optical system and/or the deflection optical system, such as a mirror, can be shifted, tilted and/or rotated in such a way that the light beam or beams are optimally introduced into the desired waveguide or waveguides.

According to an embodiment of the invention, a plurality of light sources can be provided whose light is transferred into a common path via a common coupling unit and is guided to the optical chip via a common focusing optical system and preferably a common deflection optical system. The light sources can be configured as LEDs or lasers, for example.

Alternatively or additionally, a plurality of light sources can be provided whose light is each transferred into its own path via its own coupling unit and is each guided to the optical chip via its own focusing optical system and preferably a common deflection optical system. With this configuration, light can be introduced simultaneously into several thin-film waveguides of the chip. In principle, the chip can have any number of thin-film waveguides, preferably comprising up to 24 thin-film waveguides.

It would also be conceivable for each subgroup, such as 2 of a total of 6 light sources, to be assigned its own coupling unit.

In practice, it has proven to be advantageous if the respective separate mode or the common mode is routed in an optical fiber, in particular as a polarization-maintaining and/or single-mode fiber. In other words, the path can be configured as an optical fiber. The light from the light sources or the light source is preferably transferred to the optical fiber via an optical coupler.

To enable automatic optimization of the system setting by the control unit, the control unit accesses the signal relating to the light detected by the detection unit, in particular its intensity, in the manner of a control loop or feedback system.

For this purpose, the detection unit preferably comprises one or more sensors, preferably photodiodes, by means of which a light intensity can be detected in one or more thin-film waveguides of the optical chip.

According to one embodiment, the detection unit has the same number of photodiodes as light sources are provided. So that a 1:1 mapping is achieved between a light source, a thin-film waveguide into which the light from the light source is introduced, and a sensor which monitors the light intensity in the thin-film waveguide.

Furthermore, a module according to the invention can be equipped with an acquisition unit which is configured to detect the presence of an optical chip or the chip holder in the holding device and/or the holding device, preferably by means of magnetic signals, the holding device preferably being configured to be movable. Preferably, the detection result of the acquisition unit is automatically transmitted to the control unit.

A further aspect of the present invention relates to a module according to the invention with an optical chip, which is preferably accommodated in the holding device and comprises at least one thin-film waveguide and preferably a thin-film heating element and/or a scattering structure in at least one active region for generating a reference light beam.

In addition, the invention comprises a use of a module according to the invention for retrofitting an existing optical system, in particular a microscope, in particular a microscope for total internal reflection fluorescence microscopy.

A microscope which comprises a module according to the invention is also covered by the present invention.

The invention further relates to a system comprising a module according to the invention and an optical chip, wherein the optical chip is preferably arranged in the holding device and comprises at least one coupling element and at least one decoupling element, the detection unit detects the intensity of light originating from the at least one decoupling element of the optical chip, and the control unit is configured to control the positioning unit such that the coupling unit or at least parts thereof are positioned relative to the optical chip such that light is introduced in a desired manner into the at least one coupling element of the optical chip, the positioning unit such that the coupling unit or at least parts thereof are positioned relative to the optical chip such that light is introduced into the at least one coupling element of the optical chip in a desired manner, and/or the control unit is configured to control the at least one light source such that a desired intensity is detected by means of the detection unit.

Furthermore, the invention comprises an optical system, preferably a microscope, with a module according to the invention and/or a system according to the invention.

At this point, it should be noted that the use of the indefinite articles "a" or "an" does not limit the respective reference words to the singular, but is to be interpreted in the sense of "at least one" and the present disclosure thus also includes the reference words in the plural.

Furthermore, it is pointed out that all features, advantages and effects of the present invention disclosed herein may be combined with each other as desired or may also be considered in isolation. Thus, the present disclosure is not limited to the explicitly mentioned embodiments.

BRIEF DESCRIPTION OF THE FIGURES

Further advantages, features and effects of the present invention are apparent from the following description of certain embodiments with reference to the drawings, in which identical or similar components are designated by the same reference signs. Hereby shows.

DETAILED DESCRIPTION

The modules described below enable the excitation beam path to be decoupled from the detection beam path. This is made possible by the optical excitation of the sample volume via the evanescent field of an optical chip, which can contain one or more waveguides and is in direct contact with the sample volume.

The spatially resolved detection of the excited sample volume can therefore be imaged with any available optical system and can be selected independently of the excitation scheme. This explicitly enables the use of objectives with lower optical magnification (e.g. 20×, 40×, 60×) with constant excitation and the optional omission of an immersion medium. In this way, selective, near-surface excitation of the sample volume with axial propagation below the optical wavelength can be ensured independently of the objective.

The semi-monolithic approach of integrating the optical excitation on a chip enables a highly compact and user-friendly design, so that the excitation system can be easily integrated into existing scientific as well as highly compact microscopes.

The penetration depth into the sample is preferably determined mainly by the waveguide design and is therefore user-independent. In combination with active monitoring and/or adjustment of the light power in the waveguide, this ensures reproducible measurement conditions in the sample volume.

Due to the excitation via an optical waveguide, the homogeneity of the field of view illumination is determined by the waveguide mode and not by the field of view of the microscope objective. In this way, a field homogeneity can be created that is several orders of magnitude better than with objective-based approaches.

A module according to the invention is preferably configured to couple light of different wavelengths, e.g. of the wavelengths 405 (+/20), 488 (+/20), 520 (+/20) and/or 640 (+/20) nm, into one or more waveguides. In addition to intensity modulation, a module according to the invention also enables pulsed operation over time and/or synchronization with a detector, such as a camera, by means of a corresponding design of the control unit.

A preferably automated coupling mechanism enables light to be coupled into different waveguides on the chip and ensures optimal coupling efficiency and minimized stray light background. An optical feedback signal, which is generated by defined output couplers in the optical chip, is used for intensity monitoring of the modes guided in the waveguide and enables intensity stabilization. The design of a module according to the invention enables the use of different optical chips with different waveguide geometries configured to the application.

Figure 1:
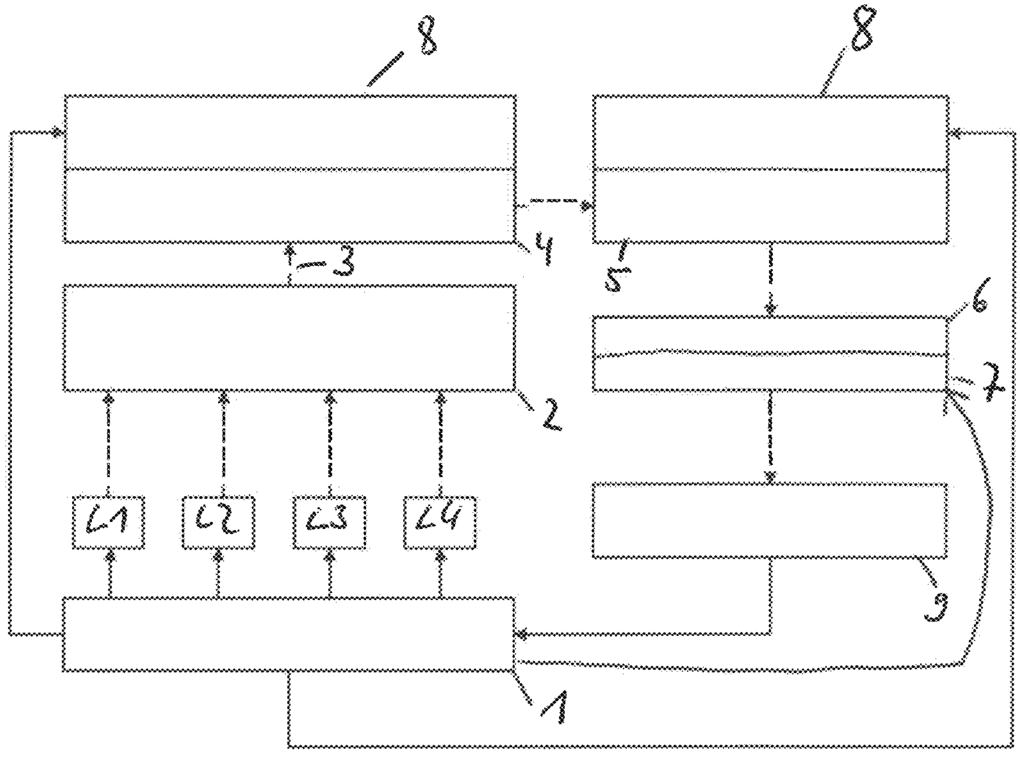
FIG. 1 a schematic view of a module according to the invention according to a first embodiment.

As shown schematically in FIG. 1, a module according to the invention comprises a control unit 1, which is connected to four light sources L1-L4, which are configured as LEDs and/or lasers. The light generated by the light sources L1-L4 is converted by an optical coupler 2 into an optical fiber 3, which is a polarization-maintaining single-mode fiber. The light is directed via focusing optical system 4 onto a mirror 5, which directs the light beam onto the chip 6, which is arranged in a holding device 7.

Both the focusing optical system 4 and the mirror 5 are equipped with their own positioning unit 8, which is connected to the control unit 1 and can position or align the focusing optical system 4 and the mirror 5 as required. The holding device 7 (also known as the chip carrier) also comprises a positioning unit, not shown in FIG. 1, by means of which the chip 6 can be positioned.

The light incident on the chip 6 is coupled via diffractive elements into thin-film waveguides located on the chip 6. Signals resulting from an interaction with the sample on the chip or particles contained therein are detected by means of a detector not shown in FIG. 1.

Particularly with efficient coupling to the respective waveguide mode, an optical reference signal is generated on the chip 6, which can be decoupled and detected via a detection unit 9 with at least one sensor, for example a photodiode. The detection result of the sensor is transmitted to the control unit 1 and can thus be used as a feedback signal, for example to optimize the coupling of the light into the respective waveguide of the chip 6 by positioning the focusing optical system 4 and/or the mirror 5 and/or the holding device 7. This optimization is preferably fully automatic and can be used, for example, to stabilize the light intensities present in the waveguides.

Figure 2:
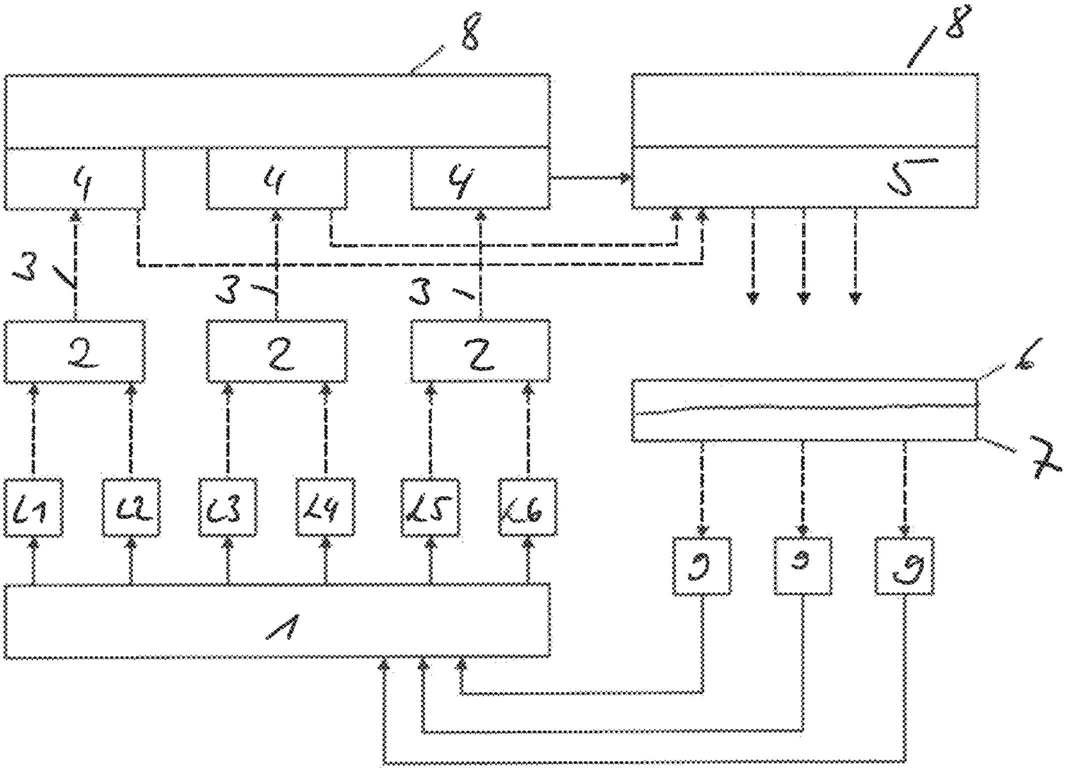
FIG. 2 a schematic view of a module according to the invention according to a first embodiment.

The embodiment shown in FIG. 2 differs from the embodiment in FIG. 1 in that several optical couplers 2 and several focusing optical system 4 are used to simultaneously introduce light into several thin-film waveguides of the chip 6. Likewise, several detection units 9 or several sensors, for example photodiodes, are provided, each of which detects the light intensity in one of the thin-film waveguides of the chip 6.

Figure 3:
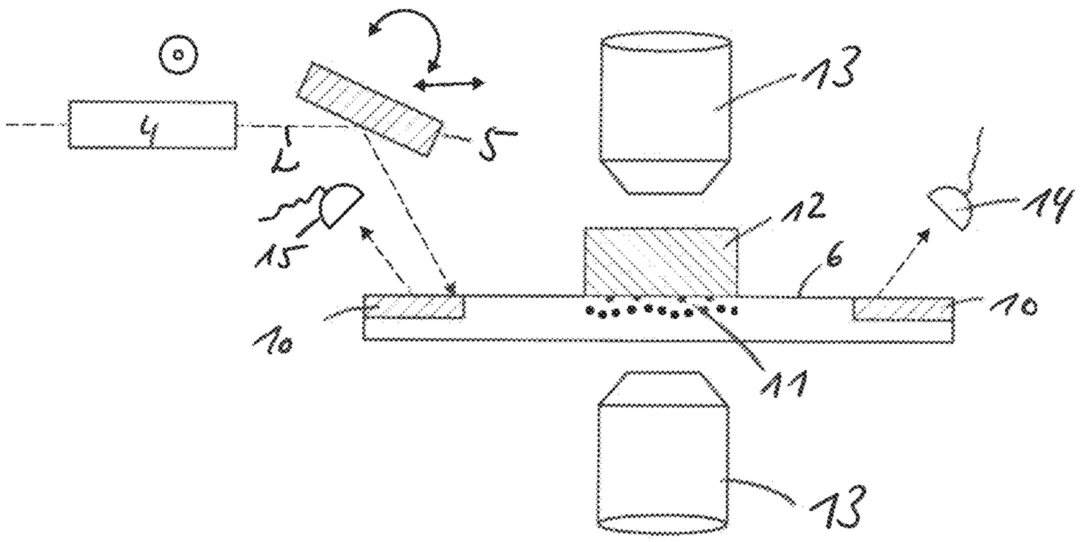
FIG. 3 a schematic view of a module according to the invention, which is used with an optical system.

As shown in FIG. 3, the light L is guided from the focusing optical system to a mirror 5, which directs the light onto the chip 6, in particular onto its diffractive area 10. The light beam can be correctly directed onto the diffractive area 10 by translating the focusing optical system and/or the mirror 5 or by translating the chip 6 in the plane.

In addition, the correct angle of incidence of the light can be set by rotating the mirror 5. The active area 11 of the chip, in which a sample can interact with an evanescent field, is shown as a dotted line. The sample volume 12 is also shown.

The sample volume can be detected from above and/or below by means of imaging optical system 13, whereby the detection is carried out at the same wavelength as the excitation and/or at a different wavelength with spectral resolution (e.g. in the case of fluorescence).

The detectors 14 and 15 are also used to detect light coupled out of one or more thin-film waveguides of the chip 6.

Figure 4:
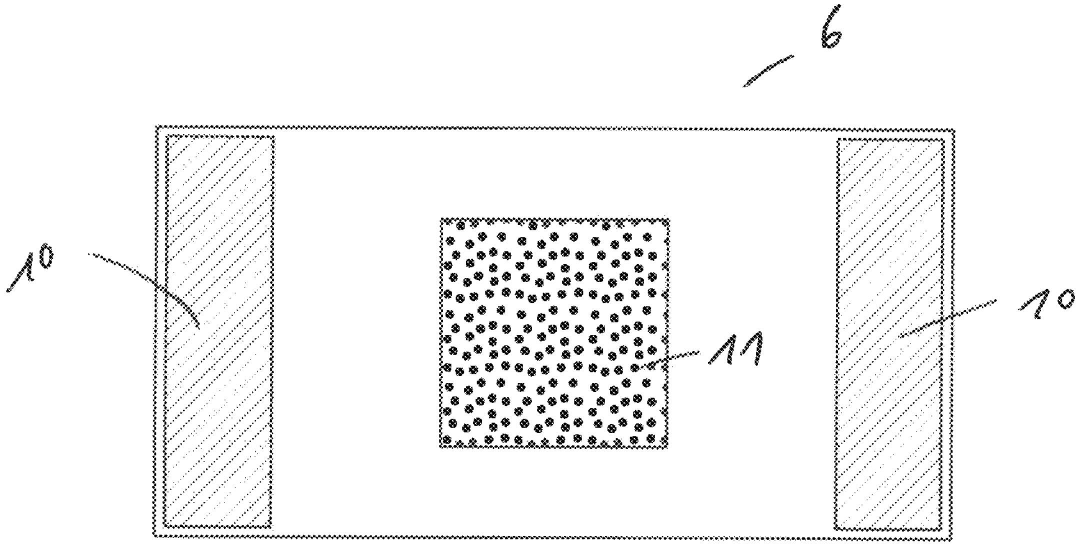
FIG. 4 an optical chip with an active area which can be used with an optical module according to the invention.

FIG. 4 shows a chip 6 which can be used with a module according to the invention and has an active area and two diffractive areas 10.

Figure 5:
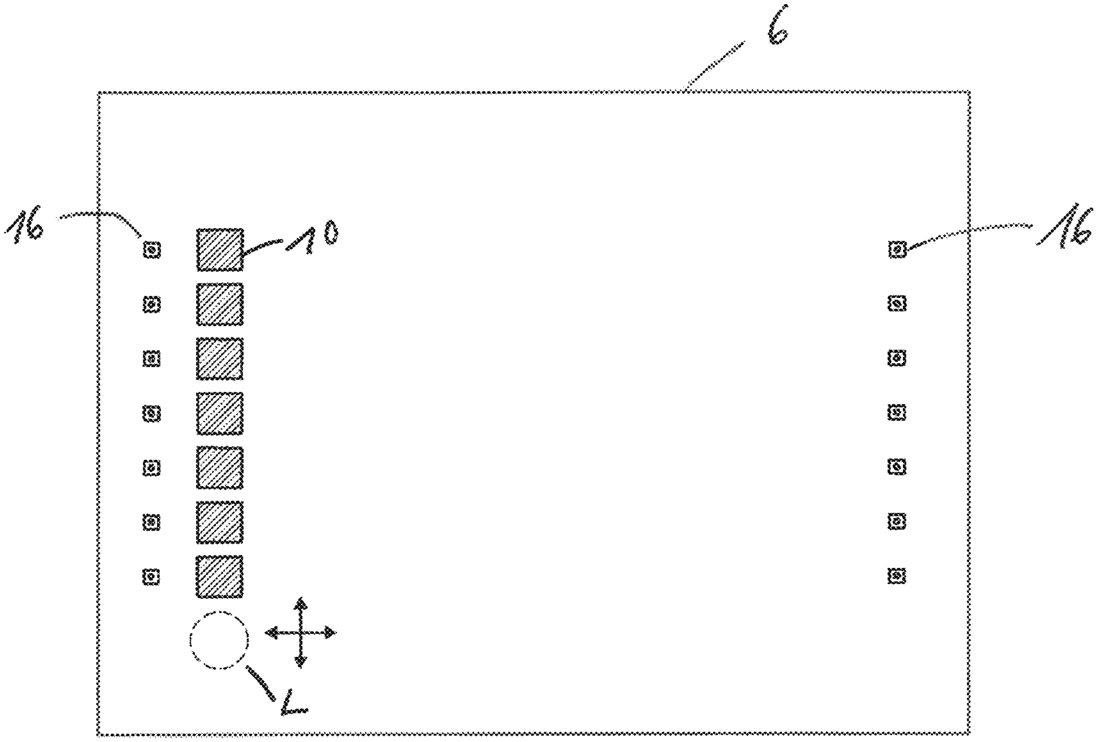
FIG. 5 an optical chip with several active areas, which can be used with an optical module according to the invention.

FIG. 5 shows a possible configuration of the coupling and decoupling areas of a chip 6 as it can be used with a module 6 according to the invention. For example, the chip shown in FIG. 5 has several diffractive areas 10, each of which is configured to couple light into a specific thin-film waveguide of the chip 6. In this embodiment, the diffractive areas 10 are arranged next to each other at a constant distance from each other along one edge of the chip 6. Alternative arrangements are conceivable.

If the light beam L is incident on a diffractive area 10 at the correct angle and in the correct position, light couples into the corresponding thin-film waveguide of the chip 6 and a certain part of the guided mode is scattered again via a diffractive decoupling element 16 in the direction of a detector 14, 15 and thus detected by the detectors.

Figure 6:
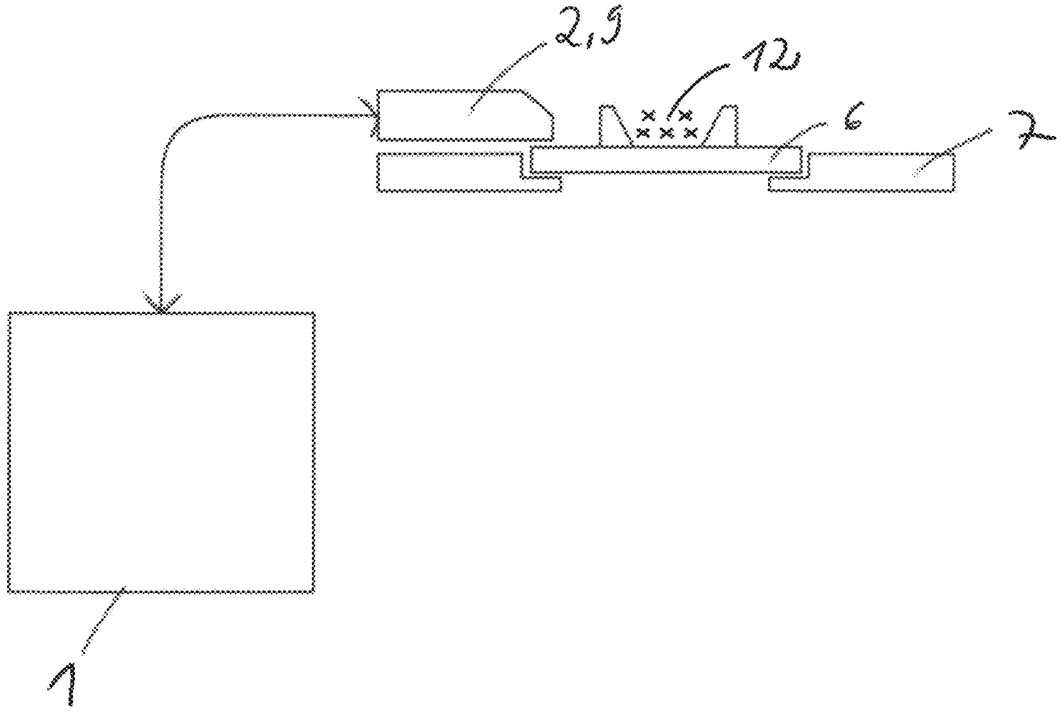
FIG. 6 a further schematic view of a module according to the invention.

The illustration in FIG. 6 shows the control unit 1, which is in a two-way optical-electronic communication link with a coupling unit. In this illustration, the units 2 and 9 for guiding light from the light sources in the direction of the chip 6 and for detecting the light guided in the chip 6 are shown in a common unit. The chip 6 is held in a holding device 7. In this embodiment, the holding device 7 preferably also serves as an adapter for an existing optical system or microscope in order to enable it to be used with an optical chip 6.

Figure 7:
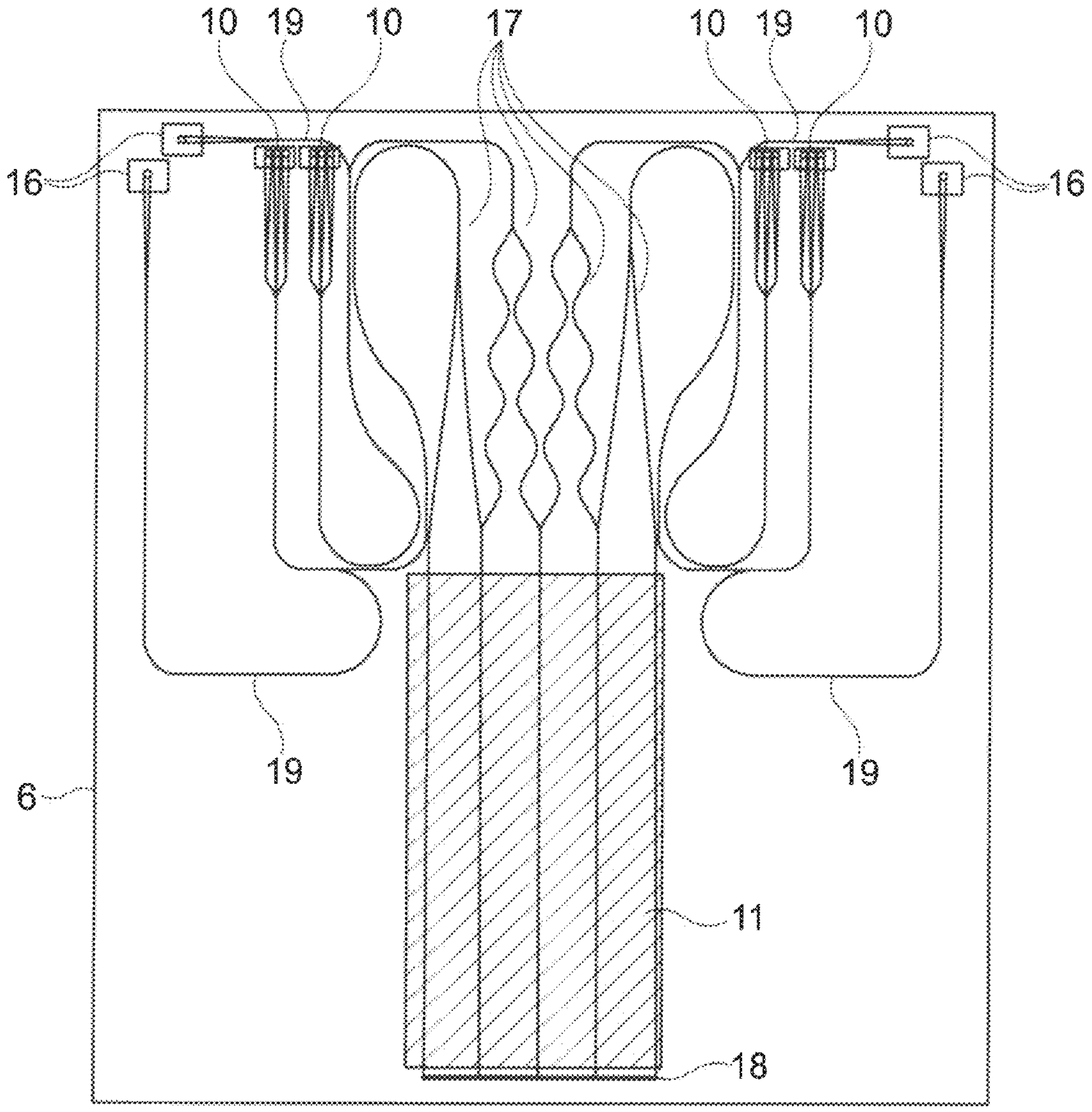
FIG. 7 a specific configuration of an optical chip.

FIG. 7 also shows a specific embodiment of a chip 6 which can be used in the context of the present invention. The chip can have a size of 5 mm×5 mm up to 30 mm×30 mm and an active area 11 with a size between 0.5 mm×0.5 mm and 15 mm×15 mm. The chip 6 has several diffractive areas. A total of four diffractive areas serve as coupling elements 10 and four diffractive areas serve as decoupling elements 16. Light is coupled into the coupling elements 10, travels through waveguides 17 to the active area 11 and is decoupled through the decoupling elements 18. Some of the light from the waveguide is coupled into a reference waveguide 19 and decoupled via an output element 16. It is also possible to couple light of different wavelengths into a waveguide via wavelength-specific coupling modules 10, the mode of which is transferred into a common waveguide.

According to a further embodiment, a module according to the invention may comprise four components, the functionality of which is explained below:

A control unit which controls 1 to 9 light sources of the same and/or different wavelengths and has control electronics for controlling the coupling unit, by means of which light is guided from the light sources into an optical fiber. The detection unit detects the intensity of light guided in the optical chip. Preferably, the control unit also comprises read-out electronics for reading out the optical power in the waveguide, which is detected by the detection unit, and evaluation electronics which, for example, compare the read-out power or intensity with a target value or range. The control unit is preferably connected to the coupling unit via an optical fiber. This optical fiber is preferably single-mode and polarization-maintaining.

An optical chip, which is for example a glass-based chip with a size between 25 and 800 $mm^2$, which has 1 to 24 optical thin-film waveguides. The chip can have diffractive coupling elements for coupling light of different wavelengths into the respective waveguide and can also be equipped with diffractive decoupling elements for monitoring and detecting the optical power in the respective waveguide. The active sample area of the chip is preferably in direct contact with the sample volume. The optical chip can contain several active areas and homogeneous illumination is achieved over the respective excitation area of the waveguide.

A coupling module, which may also be referred to as or comprise a detection unit and preferably comprises a light coupling unit containing photodiodes to detect the intensity of the reference beam in the waveguide of the chip. The coupling module may also comprise a coupling unit and may be concerned with coupling light into the chip and include deflection optical system and/or focusing optical system with motors to adjust the position of the light beam in the plane of the chip and position it accurately with high precision (about 1 μm).

This also makes it possible to adjust the coupling angle at which the light beam falls onto the substrate. The control unit is preferably configured to adjust the position of the light beam, for example by means of the positioning unit, in order to ensure optimum coupling. An acquisition unit makes it possible to detect the presence of a chip and/or a holding device (chip carrier) for the chip, preferably via magnetic signals.

The holding device for the chip or the chip carrier preferably enables the relative positioning of the optical chip to the coupling module and the relative positioning of the coupled chip system (coupling module, chip and chip carrier) relative to an imaging optical system (e.g. a lens).

The chip carrier also prevents the light from the coupling module from being directed into the surroundings during operation. The chip carrier also enables optical access to the active area of the optical chip from both the lower and upper half-space with high numerical aperture lenses and other equipment.

Further features of the present invention may be expressed in other words as follows:

The invention relates to a module for optically exciting a sample volume by means of an optical chip which contains several waveguides which can interact with the sample volume via an evanescent field.

For example, light of different wavelengths is coupled via a coupling module, in particular a coupling unit, into a waveguide located on an optical chip.

For example, by controlling the relevant optical components via the control unit, the coupling module enables the precise positioning of a light beam on the optical chip in order to couple light into a specific waveguide and optimize the coupling efficiency. This includes a positioning mechanism in the substrate plane.

The coupling module can also monitor the light in the waveguide on the optical chip via a sensor, e.g. a photodiode. This signal can be used for the automated positioning of the light or laser beam relative to the grating coupler on the optical chip as well as for intensity monitoring and intensity stabilization of the light in the respective waveguide.

The coupling unit and the detection unit can be present in a common coupling module.

A control module preferably enables automated positioning of the light beam on the waveguide chip.

An adapter module (also referred to as a holding device or chip carrier) positions the waveguide chip relative to the other components of the module, for example the coupling module, and enables access with a microscope objective of high numerical aperture from below (inverted microscope) as well as from above (upright microscope).

The control module preferably comprises light sources of different wavelengths, which are coupled together into an optical fiber that supports only one optical mode (single mode) and is optionally polarization-maintaining.

According to the invention, a homogeneous illumination of the sample volume is achieved over a range between 100 $\mu m^2$ and several $mm^2$ as well as a defined amount of light and penetration depth of the evanescent field into the sample volume. The penetration depth of the evanescent field is preferably between 5 nm and 1 μm into the sample volume.

The waveguide width is preferably between 10 μm and 5 mm and the chip size between 5 $mm^2$ and 900 $mm^2$. The intensities of the modes guided in the waveguides of the chip are in the range from a few nanowatts to a few milliwatts.

With the present invention, a high signal-to-noise ratio can be achieved, in particular due to the low background signal (no scattering effects in the lens, in the sample, etc.).

The invention can therefore improve the accuracy of scientific studies in which TIRF microscopy was previously used. It can replace all conventional TIRF microscopes and represents a system that does not need to be calibrated. It opens up new possibilities to perform TIRF microscopy in a 100× magnified observation range.

The invention claimed is:

1. A module for optically exciting a sample volume via an optical chip, comprising a control unit, a holding device for the optical chip, at least one coupling unit for introducing light into the optical chip, a positioning unit which is configured to position the coupling unit or at least parts thereof relative to the optical chip, and at least one detection unit for detecting light from at least one thin-film waveguide of the optical chip, wherein a signal relating to the light detected by the detection unit is transmitted to the control unit, which is configured to automatically control the at least one light source and/or the positioning unit on the basis of the signal.

2. The module according to claim 1, wherein the module comprises at least one light source and/or a holder for a light source.

3. The module according to claim 1, wherein the control unit is further configured to control an optical system and/or a deflection optical system on the basis of the signal.

4. The module according to claim 1, wherein a plurality of light sources is provided, whose light is converted into a common mode and is guided to the optical chip via a common optical system.

5. The module according to claim 1, wherein a plurality of light sources is provided, and light from each light source of the plurality of light sources is converted into a separate mode and is each guided to the optical chip via its own focusing optical system.

6. The module according to claim 4, wherein the common mode is guided in an optical fiber comprising a polarization-maintaining and/or single-mode fiber.

7. The module according to claim 1, wherein the detection unit has one or more photodiodes via which an intensity of the light is detected from the at least one thin-film waveguides of the optical chip.

8. The module according to claim 1, further comprising an acquisition unit which is configured to detect the presence of the optical chip and/or the holding unit.

9. The module according to claim 1, wherein the optical chip includes the least one thin-film waveguide and a thin-film heating element and/or a scattering structure in at least one active region for generating a reference light beam.

10. A system, comprising the module according to claim 1 and the optical chip, wherein the optical chip is arranged in the holding device and comprises at least one coupling element and at least one decoupling element, the detection unit detects the intensity of light originating from the at least one decoupling element of the optical chip, and the control unit is configured to control the positioning unit in such a way that the coupling unit or at least parts thereof are positioned relative to the optical chip in such a way that light is introduced into the at least one coupling element of the optical chip in a desired manner, and/or the control unit is configured to control the at least one light source in such a way that a desired intensity is detected by the detection unit.

11. An optical system, comprising the system according to claim 10.

12. The optical system of claim 11, wherein the optical system is a microscope.

13. The module according to claim 5, wherein the light from each light source of the plurality of light sources is converted into the separate mode and is each guided to the optical chip via its own focusing optical system and further via a common deflection optical system.

14. The module according to claim 8, wherein the acquisition unit is configured to detect the presence of the optical chip and/or the holding unit via magnetic signals, and wherein the holding unit is configured to be movable.

15. The module according to claim 1, wherein the signal detected by the detection unit relates to an intensity of the light.

* * * * *